US012778311B2

(12) United States Patent
Pearce et al.

(10) Patent No.: US 12,778,311 B2
(45) Date of Patent: Nov. 3, 2026

(54) CUSHIONS INCLUDING ONE OR MORE ZONES OF DIFFERENT MATERIALS AND RELATED METHODS OF MANUFACTURE FOR IMPROVED YIELD

(71) Applicant: Purple Innovation, LLC, Alpine, UT (US)

(72) Inventors: Tony M. Pearce, Alpine, UT (US); Lars Christen Hamilton, Alpine, UT (US); Tanner Rick Wheadon, Lehi, UT (US)

(73) Assignee: Purple Innovation, LLC, Draper, UT (US)

( * ) Notice: Subject to any disclaimer, the term of this patent is extended or adjusted under 35 U.S.C. 154(b) by 435 days.

(21) Appl. No.: 16/193,807

(22) Filed: Nov. 16, 2018

(65) Prior Publication Data

US 2019/0150631 A1 May 23, 2019

Related U.S. Application Data

(60) Provisional application No. 62/588,211, filed on Nov. 17, 2017.

(51) Int. Cl.

*A47C 27/14* (2006.01)
*A47C 27/00* (2006.01)
*A47C 27/08* (2006.01)
*A47C 27/10* (2006.01)
*A47C 27/15* (2006.01)
(Continued)

(52) U.S. Cl.

CPC .......... *A47C 27/144* (2013.01); *A47C 27/001* (2013.01); *A47C 27/088* (2013.01); *A47C 27/10* (2013.01); *A47C 27/15* (2013.01); *B29D 99/0092* (2013.01); *B68G 7/00* (2013.01); *A47C 27/148* (2013.01)

(58) Field of Classification Search

CPC ....... A47C 27/00; A47C 27/14; A47C 27/144; A47C 27/148; A47C 27/001; A47C 27/088; A47C 27/10; A47C 27/15; B29D 99/0092
USPC .................................................. 5/655.5, 644
See application file for complete search history.

(56) References Cited

U.S. PATENT DOCUMENTS 3,009,848 A * 11/1961 Werner ................. B26D 3/006 428/167
4,369,284 A 1/1983 Chen
(Continued)

FOREIGN PATENT DOCUMENTS

CN 102421332 A 4/2012
EP 3576578 B1 * 9/2024 .............. B68G 7/00
(Continued)

OTHER PUBLICATIONS

U.S. Appl. No. 15/662,934, filed Jul. 28, 2017, titled "Mattresses Including Spacer Fabric and Related Methods," to Moon et al., 26 pages.
(Continued)

*Primary Examiner* — Fredrick C Conley
(74) *Attorney, Agent, or Firm* — Foley & Lardner LLP

(57) ABSTRACT

A method of forming a cushioning element including forming a large cushioning element, and then dividing the large cushioning element into four equal smaller cushioning elements. The four smaller cushioning elements may be substantially the same size. Each of the smaller cushioning elements may be used as separate cushioning elements.

15 Claims, 10 Drawing Sheets

(51) Int. Cl.
*B29D 99/00* (2010.01)
*B68G 7/00* (2006.01)

(56) References Cited

U.S. PATENT DOCUMENTS

| | | | | | |
|---|---|---|---|---|---|
| 4,673,452 | A * | 6/1987 | Awdhan | A47C 27/15 | 156/254 |
| 4,694,719 | A * | 9/1987 | Levene | B26F 1/46 | 269/21 |
| 5,129,295 | A * | 7/1992 | Geffros | B26F 1/40 | 83/124 |
| 5,970,547 | A * | 10/1999 | Cavazos | A47C 27/001 | 5/690 |
| 5,994,450 | A | 11/1999 | Pearce | | |
| 6,372,076 | B1 * | 4/2002 | Ogle | B29C 44/06 | 156/308.2 |
| 6,413,458 | B1 * | 7/2002 | Pearce | A47C 27/15 | 264/141 |
| 7,730,566 | B2 | 6/2010 | Flick et al. | | |
| 7,964,664 | B2 | 6/2011 | Pearce | | |
| 8,046,973 | B2 | 11/2011 | Petrolati | | |
| 8,434,748 | B1 | 5/2013 | Pearce et al. | | |
| 8,628,067 | B2 | 1/2014 | Pearce et al. | | |
| 8,919,750 | B2 * | 12/2014 | Pearce | A47C 7/02 | 267/153 |
| 8,932,692 | B2 | 1/2015 | Pearce | | |
| 9,446,542 | B2 | 9/2016 | Whatcott et al. | | |
| 9,796,522 | B2 | 10/2017 | Pearce | | |
| 2003/0074863 | A1 | 4/2003 | Mossbeck | | |
| 2003/0135930 | A1 * | 7/2003 | Varese | A47C 27/148 | 5/727 |
| 2004/0226098 | A1 * | 11/2004 | Pearce | C08K 5/0016 | 5/655.5 |
| 2005/0223667 | A1 * | 10/2005 | McCann | A47C 27/085 | 52/403.1 |
| 2009/0100606 | A1 * | 4/2009 | An | A47C 27/15 | 5/690 |
| 2009/0126107 | A1 * | 5/2009 | Kuo | A47C 27/15 | 5/400 |
| 2010/0251864 | A1 | 10/2010 | Rose et al. | | |
| 2012/0096649 | A1 * | 4/2012 | Fukano | A47C 27/062 | 5/720 |
| 2012/0167308 | A1 * | 7/2012 | Van Lear | A47C 27/085 | 5/655.5 |
| 2012/0233784 | A1 * | 9/2012 | Wood | A47C 27/085 | 5/690 |
| 2013/0167302 | A1 * | 7/2013 | Pearce | F16F 3/0873 | 267/153 |
| 2015/0203221 | A1 | 7/2015 | Van De Hey et al. | | |
| 2015/0217534 | A1 * | 8/2015 | Rancourt | A47C 27/085 | 156/245 |
| 2016/0324329 | A1 * | 11/2016 | Costantino, III | A47C 27/22 | |
| 2017/0251824 | A1 | 9/2017 | Pearce | | |
| 2017/0251825 | A1 | 9/2017 | Pearce | | |
| 2017/0254003 | A1 | 9/2017 | Pearce | | |
| 2017/0325596 | A1 | 11/2017 | Torbet et al. | | |
| 2019/0150631 | A1 * | 5/2019 | Pearce | B68G 7/00 | |

FOREIGN PATENT DOCUMENTS

| | | | |
|---|---|---|---|
| JP | 2004065817 | A | 3/2004 |
| JP | 2004089526 | A | 3/2004 |
| NL | 9202049 | A | 6/1994 |

OTHER PUBLICATIONS

U.S. Appl. No. 15/654,948, filed Jul. 20, 2017, titled "Cushions Including a Coated Elastomeric Cushioning Element and Related Methods," to Hamilton et al., 26 pages.

International Preliminary Report on Patentability, International Application No. PCT/US2018/061584, May 19, 2020.

USPTO as International Searching Authority, International Search Report and Written Opinion, International Application No. PCT/US2018/061584, Feb. 26, 2019.

IP Australia, "Examination Report No. 1," Australian Application No. 2018368457, mailed Jan. 28, 2021.

Canadian Intellectual Property Office, "Examiner's Report," Canadian Application No. 3082585, May 31, 2021.

European Patent Office, "Communication under Rule 71(3) EPC, Intention to grant," European Application No. 18836710.6, Jun. 23, 2021.

Japan Patent Office, "Reasons for Rejection," Japanese Application No. 2020-526864, Aug. 13, 2021.

China National Intellectual Property Administration, "Office Action," Chinese Application No. 201880086222.6, Jul. 26, 2021.

Korean Intellectual Property Office, "Notice of Preliminary Rejection," Korean Application No. 10-2020-7017072, Sep. 30, 2021.

* cited by examiner

CUSHIONS INCLUDING ONE OR MORE ZONES OF DIFFERENT MATERIALS AND RELATED METHODS OF MANUFACTURE FOR IMPROVED YIELD

CROSS-REFERENCE TO RELATED APPLICATION

This application claims the benefit under 35 U.S.C. § 119(e) of U.S. Provisional Patent Application Ser. No. 62/588,211, filed Nov. 17, 2017, the disclosure of which is hereby incorporated herein in its entirety by this reference.

TECHNICAL FIELD

Embodiments of the disclosure relate generally to elastomeric cushioning elements for compressible cushions, including mattresses, seat cushions, pet beds etc. including multiple cushion zones, methods of forming cushions including multiple cushion zones, and methods of forming cushion zones from a single cushioning element.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

U.S. Pat. No. 7,730,566, "Multi-Walled Gelastic Material," issued Jun. 8, 2010, the disclosure of which is incorporated herein in its entirety by this reference, describes cushion structures having interconnected walls that buckle. A first wall buckles when a threshold force is applied. Buckling of the first wall may cause buckling of a second wall, which may decrease the chance that the first wall will "bottom out." Bottoming out would increase pressure on the portion of the cushioned object over the buckled portion of the cushion. One side of the cushion has walls spaced relatively close together, and the opposite side has walls spaced farther apart. That is, some walls of the cushion extend only partially through the cushion. The wider-spaced portions of the walls may buckle more easily than the closer-spaced portions of the walls when an irregularly shaped object presses against the walls.

U.S. Pat. No. 8,919,750, "Cushioning Elements Comprising Buckling Walls and Methods of Forming Such Cushioning Elements," issued Dec. 30, 2014, the disclosure of which is incorporated herein in its entirety by this reference, describes a cushioning element having a top cushioning surface and a bottom base surface, and which includes an elastomeric material and a stabilizing material. Interconnected buckling walls formed of the elastomeric material are connected to the stabilizing material.

Cushioning elements may be formed using injection molding. A molding system capable of molding large parts, such as cushions for use with mattresses in their various sizes, is described in U.S. Pat. No. 9,446,542, "Small Footprint Apparatus, Method, and Tooling for Molding Large Thermoplastic Parts," issued Sep. 20, 2016, assigned to the assignee of the present application, the entire disclosure of which is incorporated herein by this reference. The molding system may include platens, linear actuators, toggle clamps, injection heads, and molds. The molds for large cushioning elements are expensive due to their large size. As a result, manufacturers may purchase the largest mold they need (e.g., a mold for a king size mattress) and use that mold to form all the different sizes that they manufacture. For example, they may fabricate a king size mattress, and trim the mattress to form queen, full, and twin sized mattresses. The excess material is typically recycled or discarded.

BRIEF SUMMARY

Methods of forming a cushioning element are disclosed. The method includes forming a king size elastomeric cushion. The king size elastomeric cushion may include a plurality of intersecting buckling walls defining a plurality of hollow columns in an expanded form. The king size elastomeric cushion may be separated into four equal sized cushioning elements. The cushioning element may then be selected from the four equal sized cushioning elements.

Methods of forming a cushion are also disclosed. The method includes forming a first element comprising a compressible material and a second element comprising a compressible material. The first element may be formed surrounding a void. The second element may be formed by molding a large cushioning element from a compressible material and then separating the large cushioning element into four small cushioning elements. The four small cushioning elements may have substantially the same dimensions. At least one of the four small cushioning elements may then be selected as the second element. The method further includes inserting the second element into the void surrounded by the first element.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
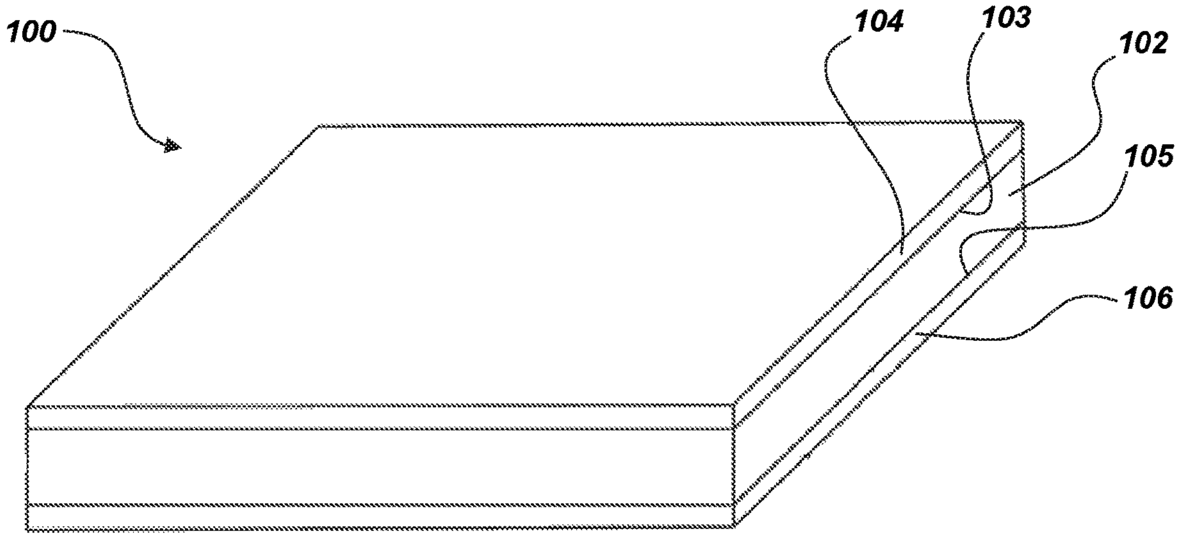
FIG. 1 is a perspective view of a cushion in an expanded form according to an embodiment of the present disclosure.

The illustrations presented herein are not meant to be actual views of any particular cushion, cushioning element, reinforcing element, or component thereof, but are merely idealized representations employed to describe illustrative embodiments. The drawings are not necessarily to scale. Elements common between figures may retain the same numerical designation.

As used herein, the term "cushioning element" means and includes any deformable device intended for use in cushioning one body relative to another. As a non-limiting example, cushioning elements (e.g., mattresses, seat cushions, pet beds, etc.) include materials intended for use in cushioning a person, animal, or object relative to another object (e.g., a bed frame, chair seat, floor, etc.) that might otherwise abut against the person, animal, or object.

As used herein the term "foam" means and includes foam materials that deflect or deform under load. Foam materials may include, by way of example and not limitation, polyethylene or polyurethane foams (e.g., convoluted foam), latex foam, or viscoelastic polyurethane foam (e.g., memory foam, open cell memory foam, or gel memory foam).

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

As used herein, any relational term, such as "first," "second," "top," "bottom," etc., is used for clarity and convenience in understanding the disclosure and accompanying drawings and does not connote or depend on any specific preference, orientation, or order, except where the context clearly indicates otherwise.

As used herein, the term "and/or" means and includes any and all combinations of one or more of the associated listed items.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

The present disclosure describes a cushion that may be roll-packed, folded, or otherwise compressed for display, storage, and/or shipping to a customer. For example, the cushion may be roll-packed into a cylindrical shape. The roll-packed cushion may be provided in a cylindrical bag. Cylindrical bags for shipping roll-packed cushions are described in, for example, U.S. patent application Ser. No. 15/063,114, "A Bag for Shipping a Cushion and Related Methods," filed Mar. 7, 2016, assigned to the assignee of the present application, the entire disclosure of which is hereby incorporated herein by this reference. Cushions compressed and disposed in cylindrical bags may be easier to handle than cushions, such as mattresses that are traditionally packaged, shipped, and sold in a flat configuration.

FIG. 1 illustrates a perspective view of a cushion 100. According to some embodiments, the cushion 100 may comprise a cushioning element 102 between a top layer 104 and a bottom layer 106. The top layer 104 may be provided on (e.g., attached to) a top surface 103 of the cushioning element 102. The bottom layer 106 may be provided on a bottom surface 105 of the cushioning element 102.

In some embodiments, the top layer 104 and the bottom layer 106 may comprise a foam material. In other embodiments, the top layer 104 may comprise a stretchable material secured to or integral with the elastomeric cushioning element 102. Such a stretchable material is described in U.S. patent application Ser. No. 15/062,621, "Mattresses and Mattress Toppers Including Knitted Fabric, and Related Methods," filed Mar. 7, 2016, assigned to the assignee of the present application, the entire disclosure of which is incorporated herein by this reference. In yet other embodiments, the cushion 100 may comprise additional layers.

Figure 2:
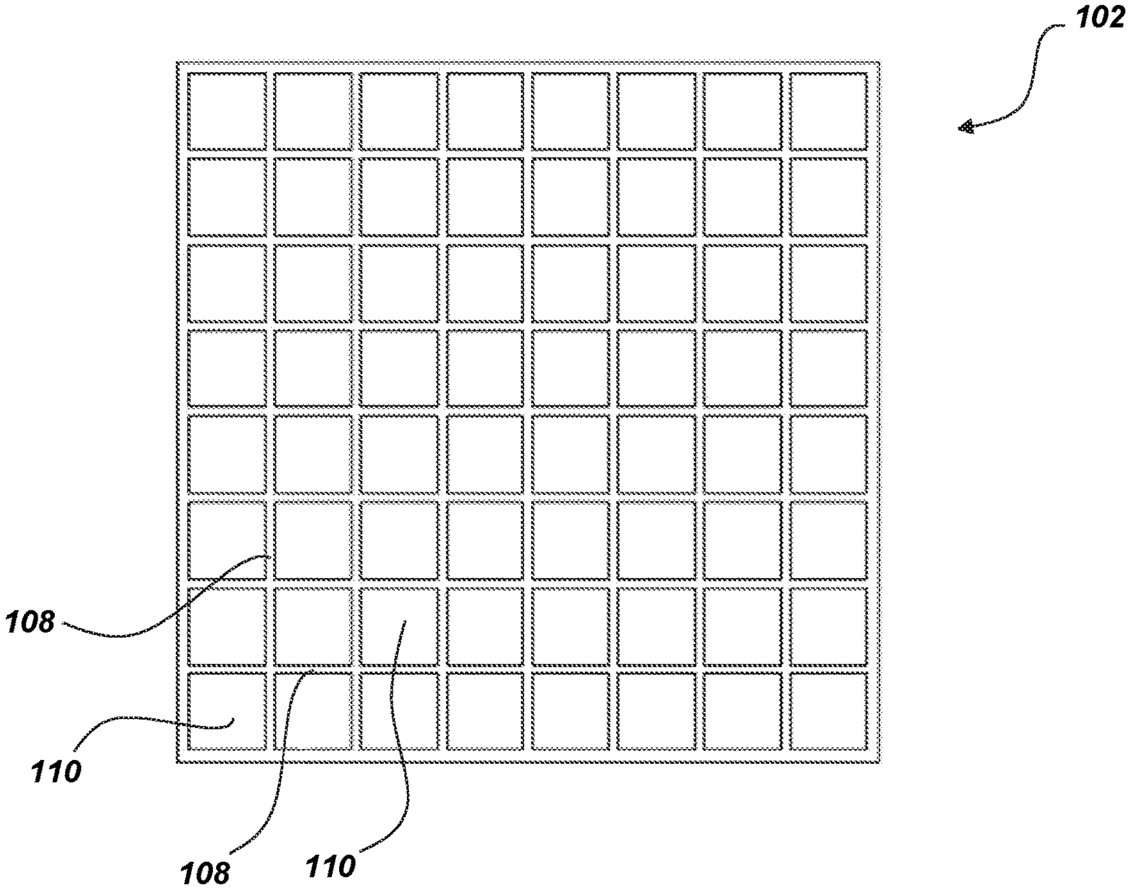
FIG. 2 is a top view of an elastomeric cushioning element in an expanded form according to an embodiment of the present disclosure.

FIG. 2 illustrates a simplified top view of an elastomeric cushioning element 102 having buckling walls 108 (e.g. cell walls, collapsible walls). The buckling walls 108 of the elastomeric cushioning element 102 may be interconnected to one another and may define hollow columns 110 (e.g. voids, cells) in an expanded form. As used herein, the term "expanded form" means and includes a state in which a cushioning element 102 has its original size and shape and wherein the buckling walls 108 are separated and define hollow columns 110 (e.g., in a substantially uncompressed state).

FIG. 2 illustrates buckling walls 108 oriented in two directions, intersecting at right angles, and defining rectangular (e.g., square) voids 110. However, the buckling walls 108 may intersect at other angles and define voids 110 of other shapes, such as triangles, parallelograms, hexagons, other quadrilaterals, polygons, etc. The elastomeric cushioning element 102 may comprise additional structures and configurations such as those structures and configurations described in, for example, U.S. Pat. No. 8,434,748, "Cushions Comprising Gel Springs," issued May 7, 2013; U.S. Pat. No. 8,628,067, "Cushions Comprising Core Structures and Related Methods," issued Jan. 14, 2014; U.S. Pat. No. 8,919,750, "Cushioning Elements Comprising Buckling Walls and Methods of Forming Such Cushioning Elements," issued Dec. 30, 2014; and U.S. Pat. No. 8,932,692, "Cushions Comprising Deformable Members and Related Methods," issued Jan. 13, 2015, the entire disclosures of each of which are incorporated herein by this reference.

The buckling walls 108 may be formed of an elastomeric material. Elastomeric materials are described in, for example, U.S. Pat. No. 5,994,450, "Gelatinous Elastomer and Methods of Making and Using the Same and Articles Made Therefrom," issued Nov. 30, 1999; U.S. Pat. No. 7,964,664, "Gel with Wide Distribution of MW in Mid-Block" issued Jun. 21, 2011; U.S. Pat. No. 4,369,284, "Thermoplastic Elastomer Gelatinous Compositions" issued Jan. 18, 1983; U.S. Pat. No. 8,919,750, "Cushioning Elements Comprising Buckling Walls and Methods of Forming Such Cushioning Elements," issued Dec. 30, 2014; the entire disclosures of each of which are incorporated herein by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, TX, under the trade name SEPTON® 4055, and from Kraton Polymers, LLC, of Houston, TX, under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset elastomers.

The elastomeric material may include one or more plasticizers, such as hydrocarbon fluids. For example, elastomeric materials may include aromatic-free food-grade white paraffinic mineral oils, such as those sold by Sonneborn, Inc., of Mahwah, NJ, under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 4:1 by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, NJ or as EVERNOX®-10, from Everspring Corp. USA, of Los Angeles, CA; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the cushioning element 102 after deformation. The resin, if present, may include a hydrogenated pure monomer hydrocarbon resin, such as those commercially available from Eastman Chemical Company, of Kingsport, TN, under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide the cushioning element 102 with an appearance appealing to consumers. In addition, a cushioning element 102 having a dark color may absorb radiation differently than a cushioning element 102 having a light color.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The elastomeric material may include a material that may return to its original shape after deformation, and that may be elastically stretched. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5.

The elastomeric cushioning element 102 may be formed using injection molding. A molding system capable of molding large cushions for use with mattresses in their various sizes, is described in U.S. Pat. No. 9,446,542, "Small Footprint Apparatus, Method, and Tooling for Molding Large Thermoplastic Parts," issued Sep. 20, 2016, the entire disclosure of which was previously incorporated by reference. The molding system may include platens, linear actuators, toggle clamps, injection heads, and molds.

Applicant has found that during production of molded cushioning elements significant amounts of cushioning material are wasted. The molds used to create molded cushioning elements can represent a large expense for cushion manufacturers. Often a single mold will be used to create multiple different sizes of cushioning elements to avoid the expense of purchasing multiple different molds. When a larger mold is used to create a smaller cushioning element the excess cushioning material must be removed and discarded. The discarded material may be reused to produce other cushioning elements; however the act of removing and discarding the material represents significant labor expense, and reduces the yield for each molding process. This significant expense often represents a lower expense with respect to the expense of purchasing and changing out different sized molds. More efficient methods of using a single mold for multiple different sizes of cushions would help reduce costs and increase product yield.

Figure 3:
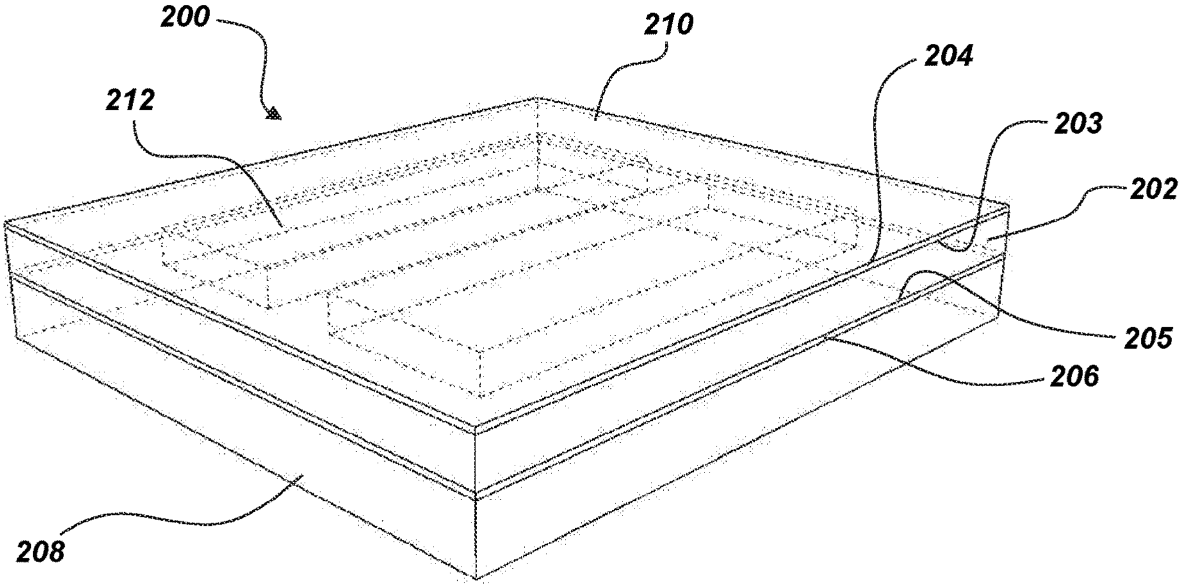
FIG. 3 is a perspective view of a cushion in an expanded form according to an embodiment of the present disclosure.

In some embodiments, a cushion may include a cushioning element that is constructed in different zones (e.g., areas, portions, elements). FIG. 3 demonstrates an embodiment of a cushion 200 with a cushioning element 202 that has different zones. The cushion 200 may include a top layer 204 and a bottom layer 206 abutting against a top surface 203 and a bottom surface 205 of the cushioning element 202. The cushion may be supported by a base 208 (e.g., box spring, bed frame, floor, or seat). The cushioning element 202 may include a first zone 210 (e.g., supporting zone, cushioned frame, perimeter cushion, etc.), and a second zone 212 (e.g., cushioning zone, interior cushion, cushion insert, sleep zone, etc.).

Figure 4:
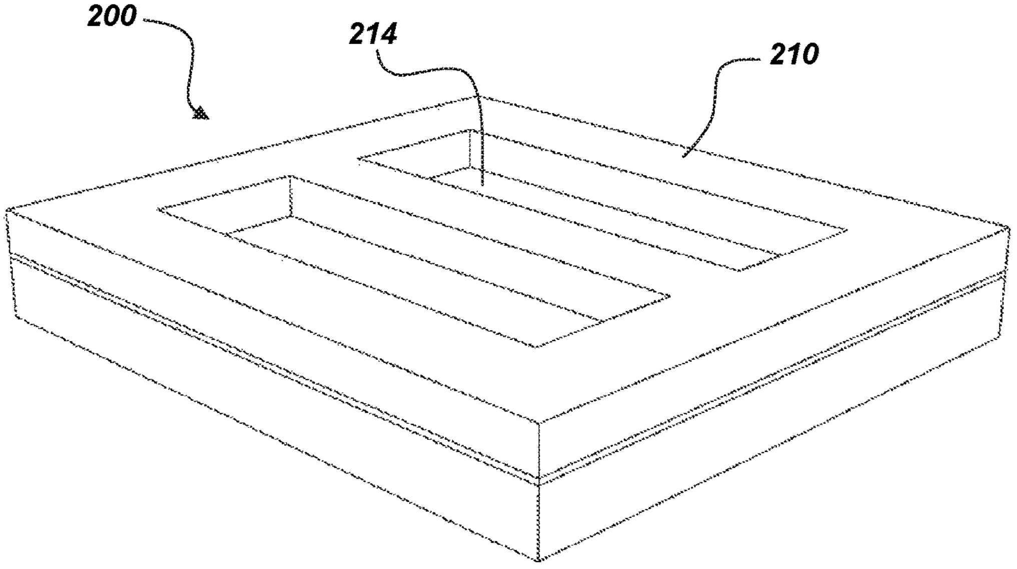
FIG. 4 is a perspective view of a perimeter cushion in an expanded form according to an embodiment of the present disclosure.

FIG. 4 demonstrates an embodiment of the cushion 200, specifically the perimeter cushion 210 (e.g., first zone). In some embodiments, the perimeter cushion 210 may be positioned around the perimeter of the cushion 200. The perimeter cushion 210 may define at least one void 214. The perimeter cushion 210 may be formed from a compressible material. The compressible material, by way of example and not limitation, may comprise a material used in the manufacture of cushions, such as, foam, gel, vinyl, rubber, springs, natural or synthetic fibers, fluid-filled flexible containers or an elastomeric polymer material.

In some embodiments, the perimeter cushion 210 may be a unitary structure (e.g. constructed from a single piece of material, formed in a single process). In some embodiments, the perimeter cushion 210 may be formed from a single piece of material by removing material from a central area of the single piece of material to form the voids 214. In another embodiment, the perimeter cushion 210 may be formed using a mold which defines the voids 214. The mold may positively define the voids 214, such that the material used to form the perimeter cushion 210 forms around the voids 214.

In another embodiment, the perimeter cushion 210 may be constructed from multiple pieces of material. In some embodiments, the multiple pieces of material may be formed from the same material. One large piece of material may by separated into smaller pieces that may be used to construct the perimeter cushion 210. In other embodiments, the multiple pieces of material may be formed from different materials. The different materials may be selected for different regions of the perimeter cushion 210. Different materials may exhibit different characteristics that may be advantageous in particular regions of the perimeter cushion 210.

Figure 5:
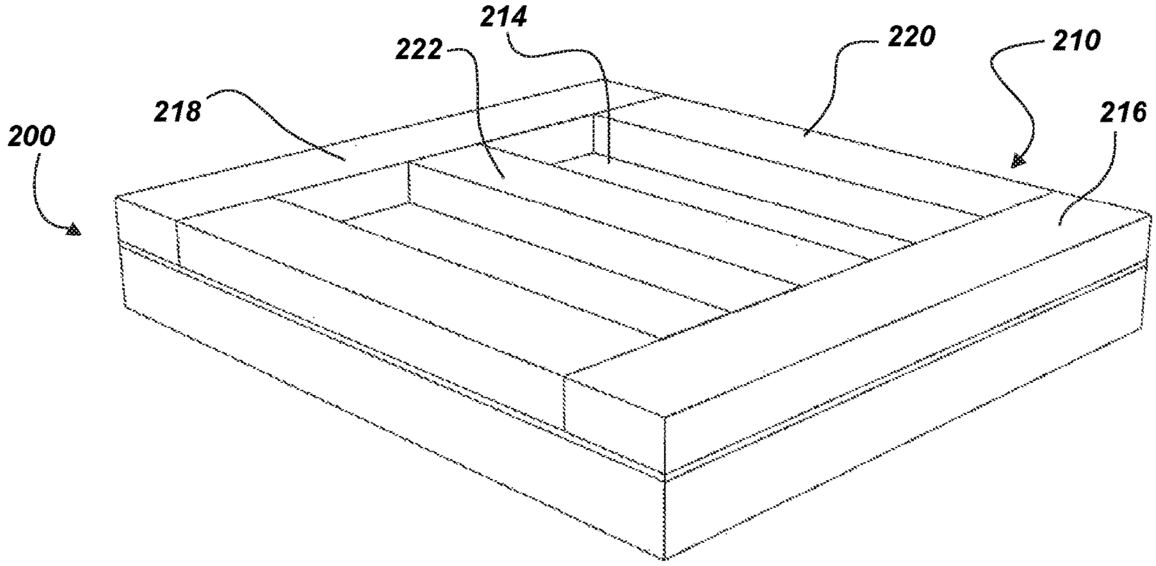
FIG. 5 is a perspective view of a perimeter cushion in an expanded form according to an embodiment of the present disclosure.

FIG. 5 demonstrates an embodiment of the cushion 200, where the perimeter cushion 210 is separated into regions. The regions demonstrated in FIG. 5 are presented by way of example and not limitation. Regions of the perimeter cushion 210 may include a head region 216, a foot region 218, a side region 220, and a middle region 222. Each region may be formed from a different material. For example, the head region 216 may be formed from a material with a higher stiffness (e.g., modulus of elasticity, Young's modulus, indentation load deflection) than the material used to form the foot region 218. Alternatively, the foot region 218 may be formed from a stiffer material than that used to form the head region 216. In another embodiment, the head region 216 and the foot region 218 may be formed from the same material and the side region 220 may be formed from a stiffer material. In other embodiments the head region 216 and the foot region 218 may be formed from a stiffer material than that used for the side regions 220. In some embodiments, the middle region 222 may be formed from a material with a lower stiffness than all of the other regions. Alternatively, the middle region 222 may be formed from a material with higher stiffness than the other regions, or a stiffness between the stiffness of the other regions. For example, the middle region 222 may be formed from a material with stiffness greater than the head region 216 and the foot region 218, and lower than the side regions 220.

In some embodiments, the perimeter cushion 210 may be formed from foam materials. The stiffness of foam materials may be measured by indentation load deflection (ILD). Foams used in the different regions of the perimeter cushion 210 may have a stiffness between about 10 ILD and about 70 ILD, such as between about 10 ILD and about 55 ILD, or between about 15 ILD and about 25 ILD. In some embodiments, each region may be formed from different foam materials, where the different foam materials may also exhibit various different levels of stiffness.

Figure 6:
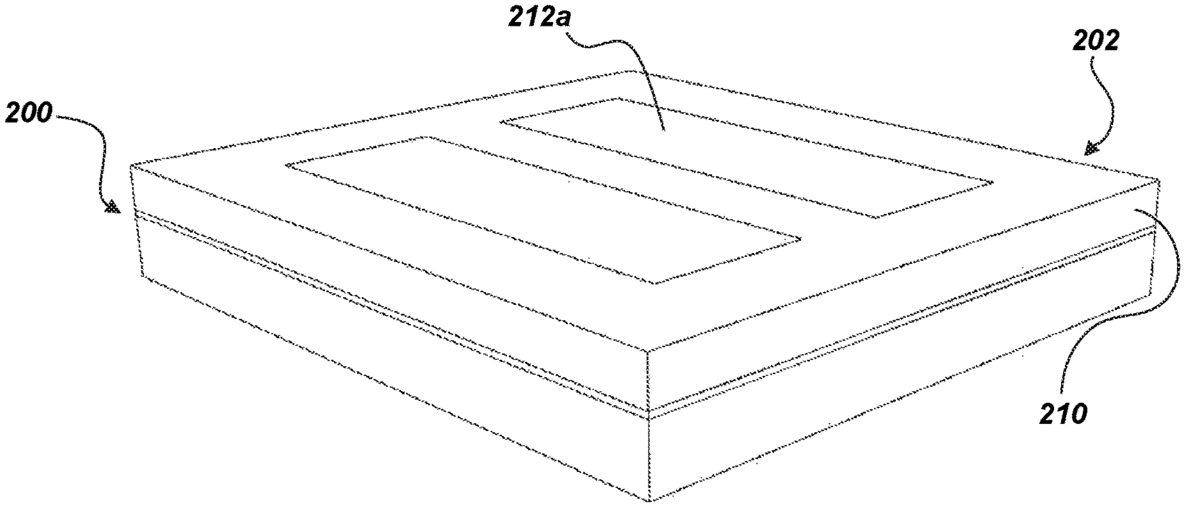
FIG. 6 is a perspective view of a cushion according to an embodiment of the present disclosure.

FIG. 6 demonstrates an embodiment of the cushion 200. The cushion 200 may include a cushion insert 212*a*. The cushion insert 212*a* (e.g., second zone) may be disposed within the voids 214 (FIGS. 4 and 5) defined by the perimeter cushion 210. In some embodiments, the cushion insert 212*a* may be formed from a foam material. The foam material may have a stiffness between about 10 ILD and about 70 ILD, such as between about 10 ILD and about 55 ILD, or between about 15 ILD and about 25 ILD. In some embodiments, the cushion insert 212*a* may be formed from a foam material with a stiffness that is different from the stiffness of the material used to form the perimeter cushion 210. In some embodiments, the foam used to form the cushion insert 212*a* may have a similar stiffness to the foam used to form at least one of the regions of the perimeter cushion 210.

In some embodiments, the cushion insert 212*a* by be formed from other cushioning materials, such as, vinyl, rubber, springs, natural or synthetic fibers, or fluid-filled flexible containers.

Figure 7:
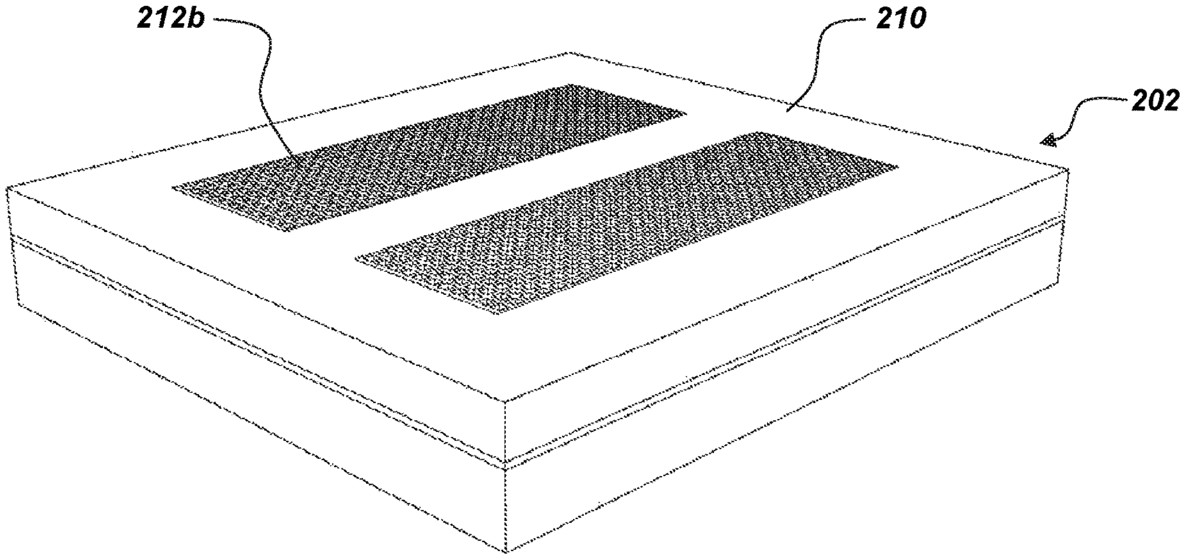
FIG. 7 is a perspective view of a cushion according to an embodiment of the present disclosure.

FIG. 7 demonstrates an embodiment of the cushion 200 including a cushion insert 212*b* disposed within the voids 214 (FIGS. 4 and 5). In some embodiments, the cushion insert 212*b* may be an elastomeric polymer similar to the elastomeric cushioning element described above and in, for example, U.S. Pat. No. 8,434,748, "Cushions Comprising Gel Springs," issued May 7, 2013; U.S. Pat. No. 8,628,067, "Cushions Comprising Core Structures and Related Methods," issued Jan. 14, 2014; U.S. Pat. No. 8,919,750, "Cushioning Elements Comprising Buckling Walls and Methods of Forming Such Cushioning Elements," issued Dec. 30, 2014; and U.S. Pat. No. 8,932,692, "Cushions Comprising Deformable Members and Related Methods," issued Jan. 13, 2015, the entire disclosures of each of which were previously incorporated by reference.

Figure 8:
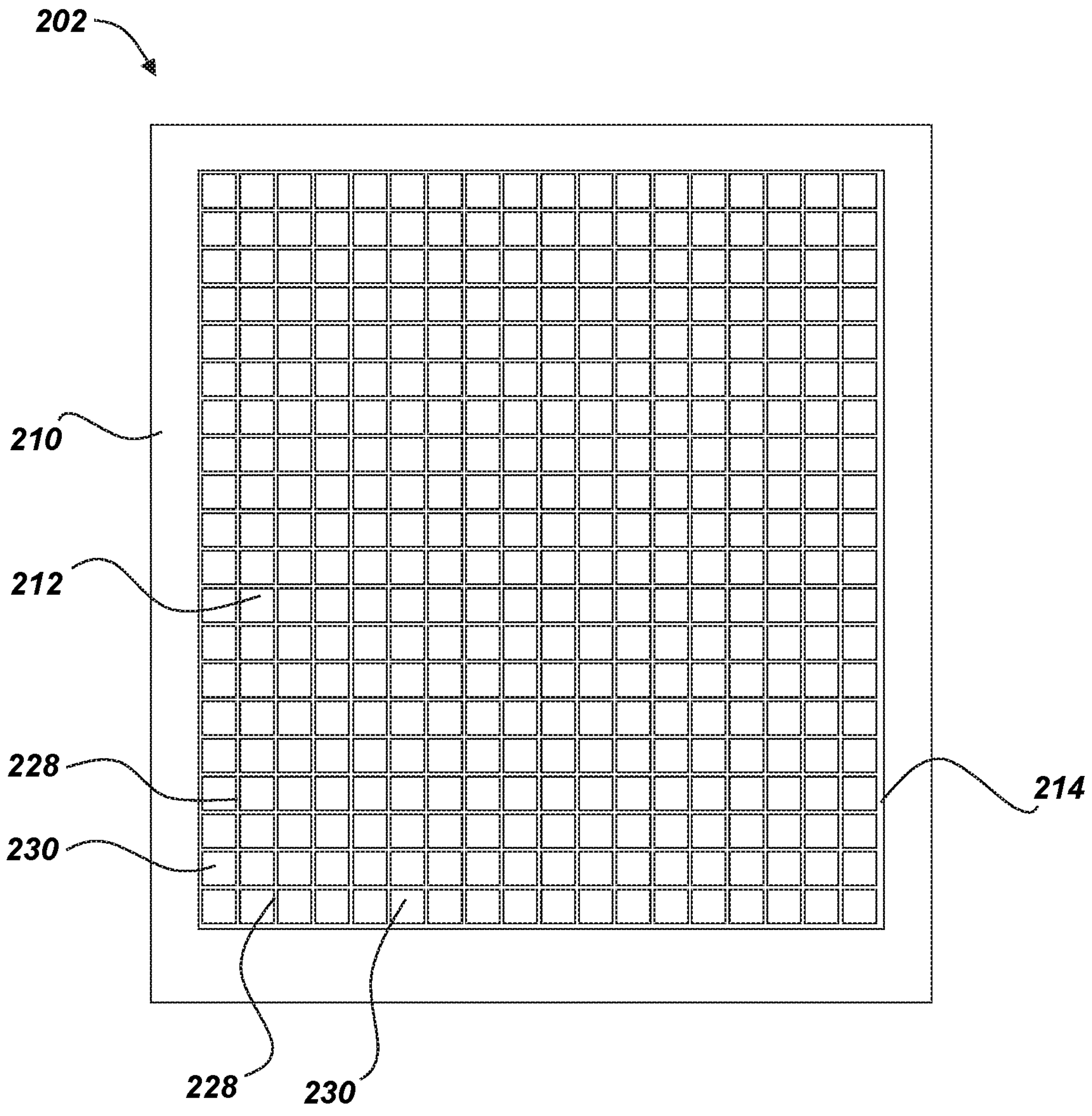
FIG. 8 is a top view of a cushioning element according to an embodiment of the present disclosure.
Figure 9:
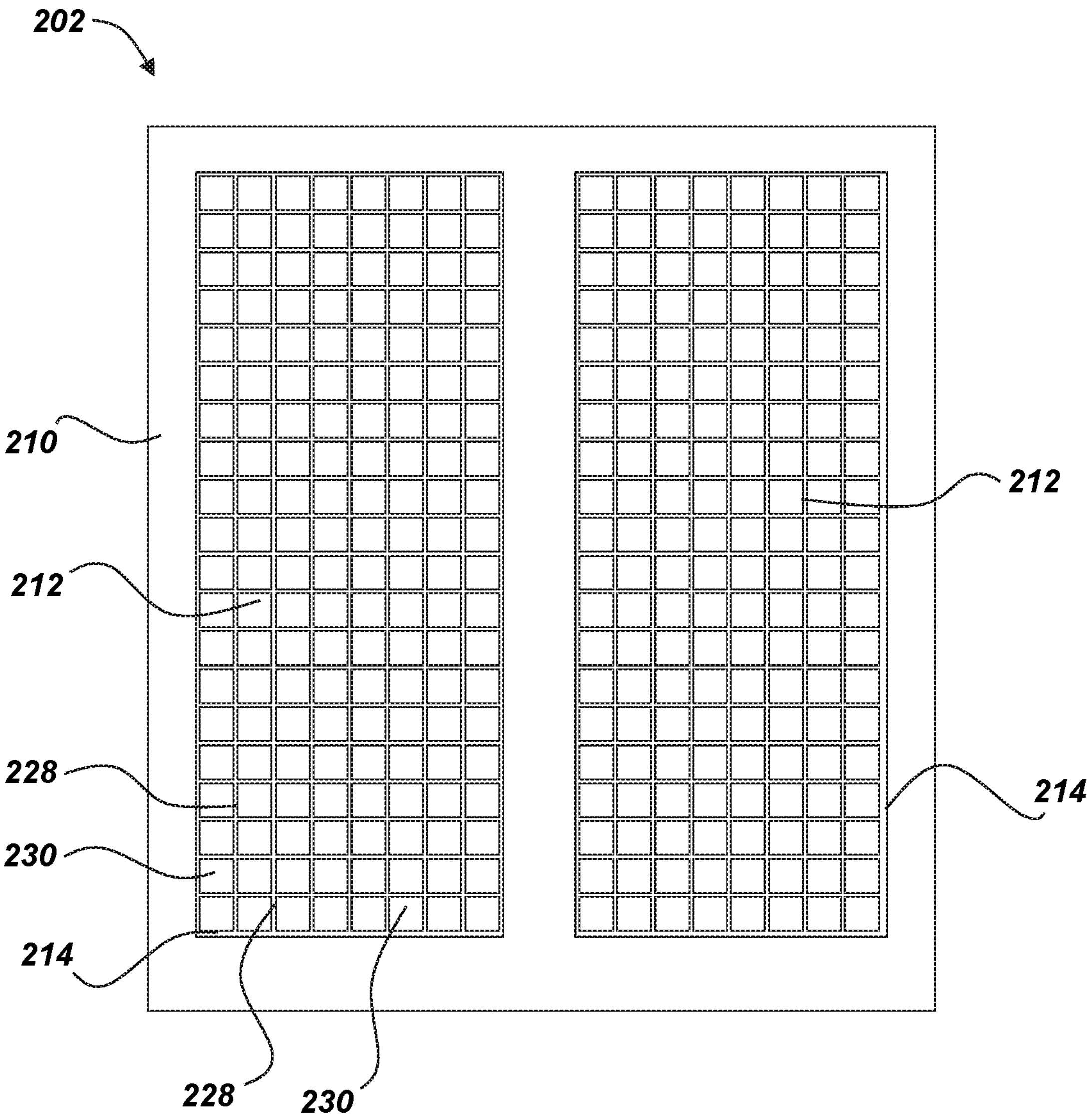
FIG. 9 is a top view of a cushioning element according to an embodiment of the present disclosure.

FIGS. 8 and 9 illustrate a top view of cushioning element 202 with elastomeric cushion inserts 212 having buckling walls 228 (e.g. cell walls, collapsible walls). The buckling walls 228 of the elastomeric cushion inserts 212 may be interconnected to one another and may define hollow columns 230 (e.g. voids, cells) in an expanded form. FIGS. 8 and 9 illustrate the buckling walls 228 oriented in two directions, intersecting at right angles, and defining rectangular (e.g., square) voids 230. However, the buckling walls 228 may intersect at other angles and define hollow columns 230 of other shapes, such as triangles, parallelograms, hexagons, other quadrilaterals, polygons, etc. The elastomeric cushion insert 212 may comprise additional structures and configurations such as those structures and configurations described in, for example, U.S. Pat. No. 8,434,748, "Cushions Comprising Gel Springs," issued May 7, 2013; U.S. Pat. No. 8,628,067, "Cushions Comprising Core Structures and Related Methods," issued Jan. 14, 2014; U.S. Pat. No. 8,919,750, "Cushioning Elements Comprising Buckling Walls and Methods of Forming Such Cushioning Elements," issued Dec. 30, 2014; and U.S. Pat. No. 8,932,692, "Cushions Comprising Deformable Members and Related Methods," issued Jan. 13, 2015, the entire disclosures of each of which were previously incorporated by reference.

The cushion inserts 212 may be formed to be complimentary to the voids 214. The cushion inserts 212 may have dimensions smaller than the external dimensions of the cushioning element 202 into which the cushion inserts 212 are inserted. In some embodiments, the cushion inserts 212 may have dimensions smaller than the voids 214. In some embodiments, the dimensions of the cushion inserts 212 may be substantially smaller than the voids, such that, multiple cushion inserts 212 may be used to fill the voids 214. In other embodiments, the dimensions of the cushion inserts 212 may be only slightly smaller than the voids 214 to facilitate easy insertion and removal of the cushion inserts 212 from the voids 214. In some embodiments, the dimensions of the cushion inserts 212 may be substantially the same or larger than the voids 214, such that, once inserted the cushion inserts 212 may be secured in place due to mechanical interference between the cushion insert 212 and the perimeter cushion 210.

The cushioning element 202 may have any selected dimensions based on the intended use. For example, if the cushion 200 is a mattress for a king size bed, the cushioning element 202 may be about 76 inches (193 cm) by about 80 inches (203 cm), with a thickness of about 2 inches (5.08 cm). If the cushion 100 is a mattress for a queen size bed, the cushioning element 202 may be about 60 inches (152 cm) by 80 inches (203 cm), with a thickness of about 2 inches (5.08 cm). If the cushion 100 is a mattress for an extra-long twin size bed, the cushioning element 202 may be about 38 inches (96.5 cm) by 80 inches (203 cm), with a thickness of about 2 inches (5.08 cm). If the cushion 100 is a small pet bed, the cushioning element 202 may be about 19 inches (48.2 cm) by about 26 inches (66 cm) with a thickness of about 1 inch (2.54 cm). If the cushion 100 is a medium pet bed, the cushioning element 202 may be about 29 inches (73.6 cm) by about 38 inches (96.5 cm) with a thickness of about 1 inch (2.54 cm). If the cushion 100 is a large pet bed, the cushioning element 202 may be about 38 inches (96.5 cm) by about 50 inches (127 cm) with a thickness of about 1 inch (2.54 cm). In some embodiments, the cushioning element 202 may have any other selected thickness, such as about 3 inches (7.62 cm), about 1 inch (2.54 cm), or about 4 inches (10.16 cm).

Referring to FIG. 8. In some embodiments, the perimeter cushion 210 may define one void 214. A cushion insert 212 may then be inserted into the void 214. The cushion inserts 212 may have dimensions smaller than the cushioning element 202 into which the cushion insert 212 is inserted. For example, if the cushioning element 202 is for a king size mattress, the cushion insert 212 may be less than about 70 inches (178 cm) by about 72 inches (183 cm), with a thickness of about 2 inches (5.08 cm). If the cushioning element 202 is for a queen size mattress, the cushion insert 212 may be less than about 54 inches (137 cm) by 72 inches (183 cm), with a thickness of about 2 inches (5.08 cm). If the cushioning element 202 is for an extra-long twin size mattress, the cushion insert 212 may be about 30 inches (76 cm) by 72 inches (183 cm), with a thickness of about 2 inches (5.08 cm). In some embodiments, the cushion insert 212 may have the same thickness as the cushioning element 202, such as about 3 inches (7.62 cm), about 1 inch (2.54 cm), or about 4 inches (10.16 cm). In other embodiments, the cushion insert 212 may have a thickness less than the thickness of the cushioning element 202 or greater than the thickness of the cushioning element 202.

Referring to FIG. 9. In some embodiments the cushion inserts 212 may have substantially the same dimensions regardless of the intended use. For example, the cushion inserts 212 may be less than the dimensions of an extra-long twin size mattress which is about 38 inches (96.5 cm) by 80 inches (203 cm), such as about 30 inches (76 cm) by 72 inches (183 cm), about 26 inches (66 cm) by 80 in (203 cm), about 25 inches (63.5 cm) by 72 inches (183 cm), about 26 inches (66 cm) by 54 inches (137 cm), about 25 inches (63.5 cm) by 56 inches (142 cm), or about 20 inches (51 cm) by 50 inches (127 cm). In some embodiments, the size of the cushion inserts 212 for a mattress may be selected based on the average size of the person or animal that will be sleeping on it. The dimensions may be selected such that the cushion inserts 212 may extend between the shoulder region and hip region of an average person who would use the mattress. The cushion inserts 212 may then be inserted into a mattress of any size in the area where the average person would sleep, such that the shoulder and hip region of the average person would be substantially over the cushion insert when sleeping.

In some embodiments, the voids 214 in the perimeter cushion 210 may be formed to complimentary dimensions to the cushion inserts 212. In embodiments where the cushion inserts 212 are substantially the same size regardless of the intended use, the same cushion inserts 212 may be inserted into the voids 214 of the perimeter cushion of the cushioning element 202 whether the cushioning element 202 is intended for use in a twin sized mattress, a king sized mattress, or any other size of cushion. In some embodiments, a larger cushion may have multiple voids 214 defined by the perimeter cushion 210. For example, in some embodiments, the perimeter cushion 210 may define two voids 214 as shown in FIG. 9. In other embodiments the perimeter cushion 210 may define more than two voids 214 (e.g., three voids, four voids, etc.).

In some embodiments, the elastomeric cushion inserts 212 may be formed by the injection molding process described above. In some embodiments, the elastomeric cushion insert 212 may be formed using a mold that is the same size as the elastomeric cushion insert 212 to form each elastomeric cushion insert 212 by an individual process.

Figure 10:
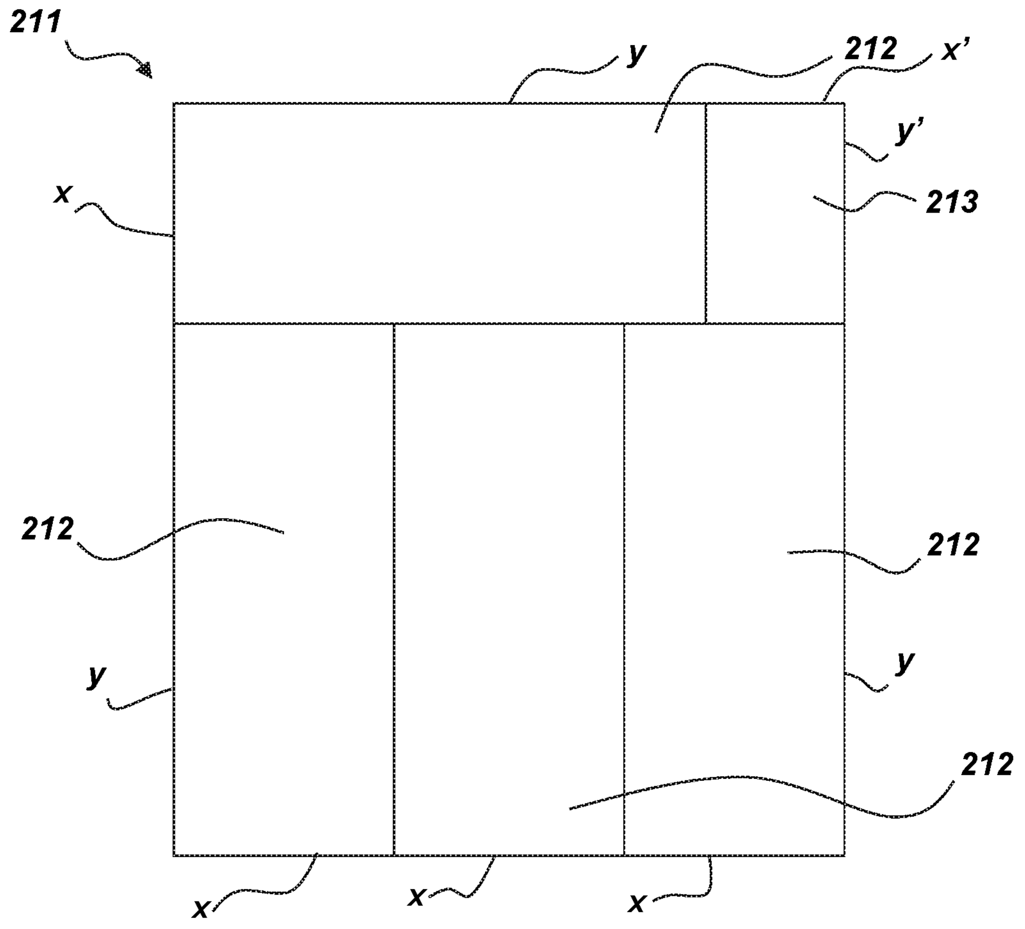
FIG. 10 is a top view of an elastomeric cushioning element according to an embodiment of the present disclosure.

Referring to FIG. 10, in some embodiments, the elastomeric cushion inserts 212 may be formed using a large mold. For example, the elastomeric cushion inserts 212 may be formed using a mold that would be used for forming a king size elastomeric cushioning element 211. After forming the large elastomeric cushioning element 211, the elastomeric cushioning element 211 may be separated into multiple elastomeric cushion inserts 212. The cushion inserts 212 may be separated by cutting the elastomeric cushioning element 211 using a process such as, for example, a wet saw process, a dry saw process, a hot wire process, a hot knife process, or other processes known in the art.

In embodiments where the elastomeric cushion inserts 212 are formed using a large mold, the dimensions may depend upon the large mold being used. In some embodiments, by way of example and not limitation, a king size mattress mold may be used. A king sized mattress mold may have a width between about 76 inches (193 cm) and about 82 inches (208 cm), such as, between 78 inches (198 cm) and about 81 inches (205.75 cm) (e.g., about 80 inches (203.2 cm)), and a length between about 80 inches (203 cm) and about 84 inches (213 cm), such as, between about 81 inches (205.75 cm) and about 83 inches (210.8 cm) (e.g., about 82 inches (208 cm)). In some embodiments, the king size mattress mold may have dimensions larger than the final dimensions of a king size cushioning element. The large elastomeric cushioning element 211 may have substantially the same dimensions as the large mold. For example, if the large mold is a king size mattress mold, the large elastomeric cushioning element 211 may have a width between about 76 inches (193 cm) and about 82 inches (208 cm), and a length between about 80 inches (203 cm) and about 84 inches (213 cm). In some embodiments, after molding the large elastomeric cushioning element 211 the smaller elastomeric cushion inserts 212 may be separated.

In some embodiments, the dimensions of the elastomeric cushion inserts 212 may be selected to maximize the yield of elastomeric cushion inserts 212 from each large elastomeric cushioning element 211. FIG. 10 demonstrates an embodiment where a large elastomeric cushioning element 211 is separated into multiple elastomeric cushion inserts 212. In some embodiments the elastomeric cushioning element 211 may be separated into four similarly sized (e.g., the same sized) elastomeric cushion inserts 212. The elastomeric cushion inserts 212 may each have a dimension x and a dimension y as shown in FIG. 10. For example, if the elastomeric cushioning element 211 is a king size elastomeric cushioning element, the dimension x may be between about 22 inches (56 cm) and about 27 inches (68.5 cm), such as between about 22 inches (56 cm) and about 23 inches (58.5 cm) (e.g., about 23 inches (58.5 cm) or about 24 inches (61 cm)). The y dimension may be between about 54 inches (137 cm) and about 59 inches (150 cm), such as between about 54 inches (137 cm) and about 55 inches (139.5 cm) (e.g., about 54 inches (137 cm).

Three of the elastomeric cushion inserts 212 may be oriented side-by-side in the longitudinal direction relative to the elastomeric cushioning element 211 and extending from one end of the elastomeric cushioning element 211, as shown in FIG. 10. The fourth elastomeric cushion insert 212 may be oriented horizontally and may extend along and adjacent longitudinal ends of the three side-by-side elastomeric cushion inserts 212, as shown in FIG. 10.

When the cushioning element 211 is separated into four sections there may be a small scrap portion 213 remaining. In some embodiments, the scrap portion 213 may be used to form a smaller independent cushioning element, such as, by way of example and not limitation, a pet bed, seat cushion, or a pillow. In other embodiments, the scrap portion 213 may be used in conjunction with other scrap portions and assembled to fill the voids 214 (FIG. 9) in the cushion 202 (FIG. 9). The scrap portion 213 may have dimensions x' and y', at least partially defined by the size of the elastomeric cushion inserts 212. The dimension x' may be between about 17 inches (43 cm) and about 26 inches (66 cm), such as between about 17 inches (43 cm) and about 19 inches (48 cm). The dimension y' may be between about 21 inches (53 cm) and about 30 inches (76 cm), such as between about 21 inches (53 cm) and about 23 inches (58.5 cm).

In yet other embodiments, the small scrap portion 213 may simply be recycled or discarded.

In some embodiments, the cushioning element 211 may be separated horizontally (e.g., on the horizontal plane). For example, a cushioning element 211 that is 4 inches (10.16 cm) thick may be separated into two cushioning elements 211 which are each 2 inches (5.08 cm) thick. In another example, a cushioning element 211 may be separated into two cushioning elements 211, where one cushioning element 211 is about 3 inches (7.62 cm) thick and the other cushioning element 211 is about 1 inch (2.54 cm) thick. Cushioning elements 211 with other thicknesses (e.g., 3 inches (7.62 cm), 2 inches (5.08 cm)) may also be separated horizontally to form cushioning elements 211 of smaller thicknesses (e.g., 1 inches (5.08 cm), 2 inches (7.62 cm), and 0.5 inches (1.27 cm). In some embodiments, the elastomeric cushion inserts 212 may be separated horizontally after they have been separated from the cushioning element 211.

Figure 11:
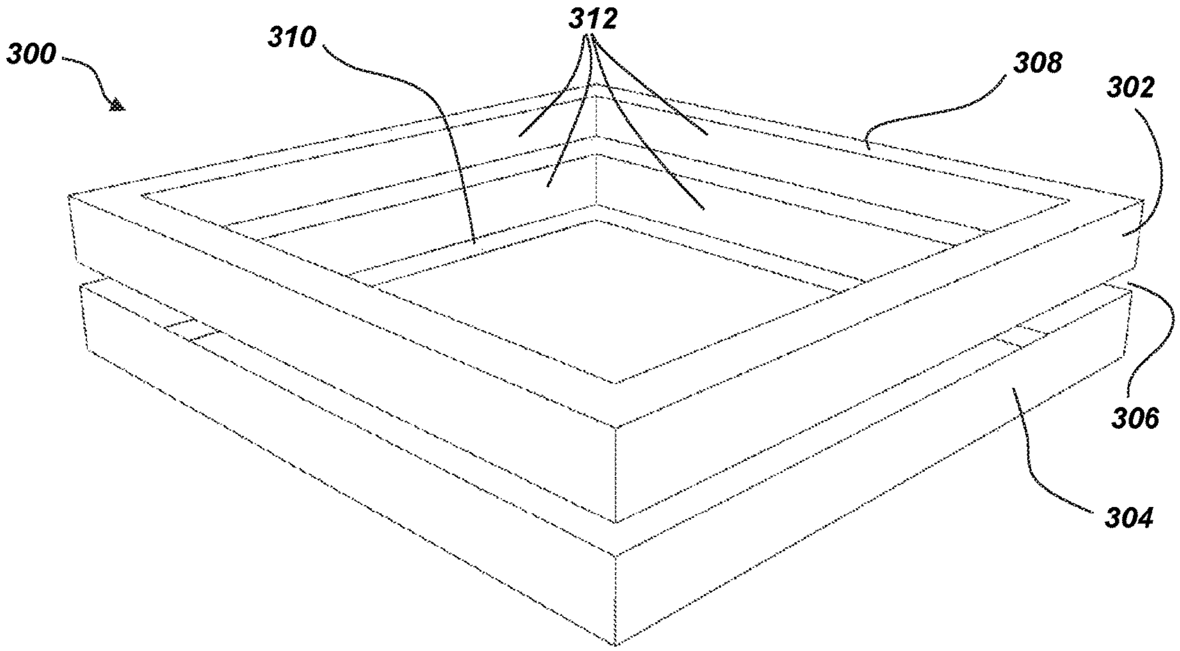
FIG. 11 is a perspective view of a jig according to an embodiment of the present disclosure.
Figure 12:
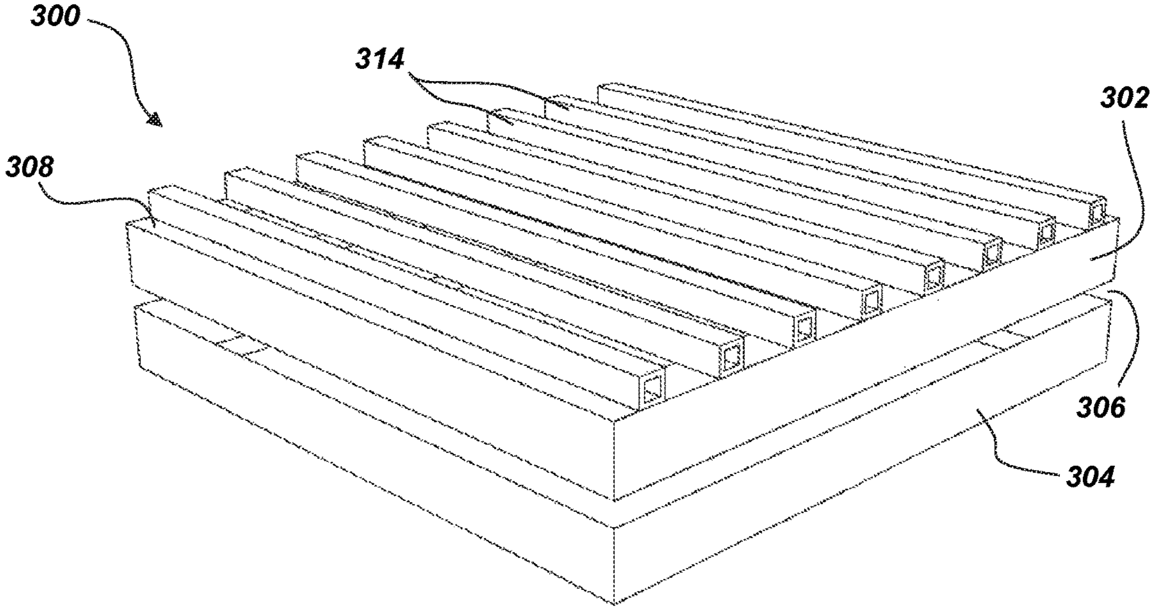
FIG. 12 is a perspective view of a jig according to an embodiment of the present disclosure.
Figure 13:
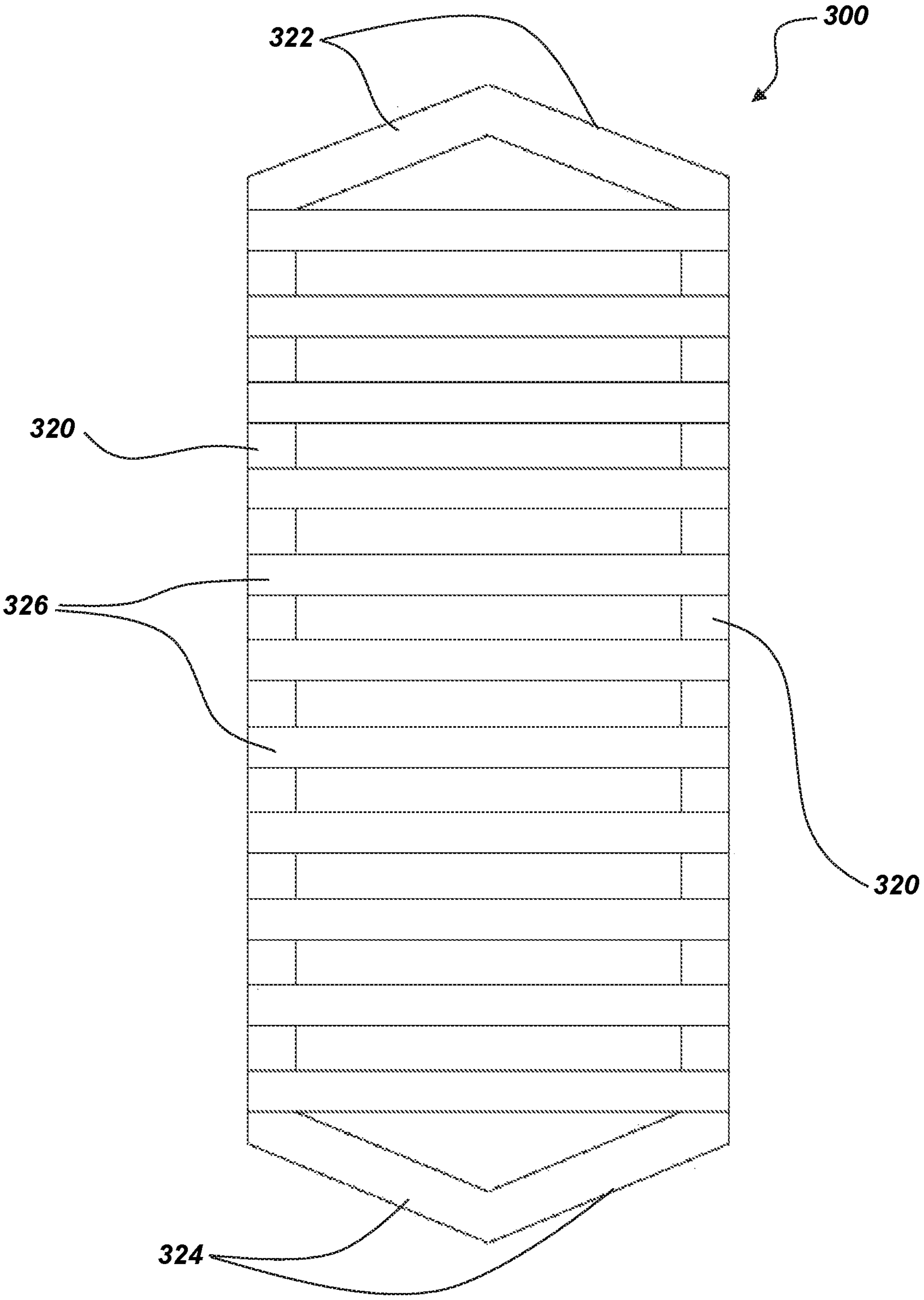
FIG. 13 is a top view of a jig according to an embodiment of the present disclosure.

In some embodiments, the cushioning element 211 may be separated horizontally through a cutting process (e.g., a wet saw process, a dry saw process, a hot wire process, a hot knife process). FIGS. 11, 12, and 13 illustrate embodiments of a jig 300 that may be used to separate the cushioning element 211 (FIG. 10) horizontally. In some embodiments, the cushioning element 211 (FIG. 10) may be placed in a jig 300 (e.g., frame, support, guide, template) before cutting. The cushioning element 211 (FIG. 10) may be compressed in the jig 300 such that the adjacent buckling walls 228 (FIG. 8) in the cushioning element 211 (FIG. 10) are substantially pressed together and may be collapsed such that hollow columns 230 (FIG. 8) may be minimized or may not substantially exist. The jig 300 may be configured to compress the cushioning element 211 (FIG. 10) into different shapes (e.g., a square, a rectangle, a diamond, an oval, a hexagon, etc.). In some embodiments, the shape of the jig 300 may be determined for maximizing the compression of the cushioning element 211 (FIG. 10). In other embodiments, the shape of the jig may be influenced by a limited cutting width of the cutting process being used.

FIG. 11 illustrates a perspective view of an embodiment of a jig 300. In some embodiments, the jig 300 may be substantially diamond shaped. The jig 300 may have a top portion 302 and a bottom portion 304. The top portion 302 and the bottom portion 304 may be configured such that when a cushioning element 211 (FIG. 10) is placed between the top portion 302 and the bottom portion 304 a space 306 remains between the top portion 302 and the bottom portion 304. The top portion 302 may have a top shelf 308 that may rest on a top portion of the cushioning element 211 (FIG. 10) when the jig is assembled. The bottom portion 304 may have a bottom shelf 310 which may contact a bottom portion of the cushioning element 211 (FIG. 10).

The top portion 302 and the bottom portion 304 may also have side walls 312 which may secure the side portions of the cushioning element 211 (FIG. 10). The side walls 312 in conjunction with the top shelf 308 and the bottom shelf 310 may effectively secure the cushioning element 211 (FIG. 10) within the jig 300.

FIG. 12 illustrates a perspective view of an embodiment of a jig 300. In some embodiments, the jig 300 may include bracing 314. In some embodiments, the bracing 314 may be located on the top shelf 308. In other embodiments, the bracing 314 may be located below the bottom shelf 310. Some embodiments may include bracing 314 on the top shelf 308 and below the bottom shelf 310. The bracing may be configured to secure portions of the cushioning element 211 (FIG. 10) that are not in contact with the top shelf 308 or the bottom shelf 310. In some embodiments, the bracing 314 may be configured to add weight to the top portion 302 to maintain a compressive force on the cushioning element 211 (FIG. 10). In some embodiments, the bracing 314 may comprise a planar sheet of material enclosing the top portion 302 and/or the bottom portion 304 of the jig 300. In other embodiments, the bracing 314 may comprise a plurality of members (e.g., bars, rods, tubing, posts) arranged on the top portion 302 and/or the bottom portion 304.

FIG. 13 illustrates a top view of another embodiment of a jig 300. In some embodiments, the jig 300 may have an elongated hexagonal shape. The jig 300 may have extended sides 320 with diagonal front walls 322 and diagonal rear walls 324. The extended sides 320 of the jig 300 may be separated by a distance defined by bracing 326. The size of the bracing 326 may be determined based on limitations of the cutting process being implemented. For example, if a wet saw process is used to cut the cushioning element 211 (FIG. 10) horizontally, the size of the bracing 326 may be selected to be less than the maximum cutting width of the wet saw blade.

The jig 300 may be formed from a substantially rigid material, such as wood, metal (e.g., aluminum, steel, etc.), composites (e.g., fiberglass, carbon fiber, etc.), or any combination thereof.

Now referring to FIGS. 11 and 12. In some embodiments, the cutting process may cut the cushioning element 211 (FIG. 10) in the area exposed by the gap 306 between the top portion 302 and the bottom portion 304 of the jig 300. In some embodiments, a wet saw process may be used to cut the cushioning element 211 (FIG. 10). For example, a lubricated band saw may be used. The band saw blade may pass through the gap 306 between the top portion 302 and the bottom portion 304 cutting the cushioning element 211 (FIG. 10). In another example, a lubricant may be placed on the cushioning element 211 (FIG. 10) before being compressed into the jig 300. In some embodiments, an oscillating saw may be used to cut the cushioning element 211 (FIG. 10). For example, the oscillating saw blade may pass through the gap 306 cutting the cushioning element 211 (FIG. 10). In some embodiments, the oscillating saw blade may be dry (e.g., not use lubricant).

Figure 14:
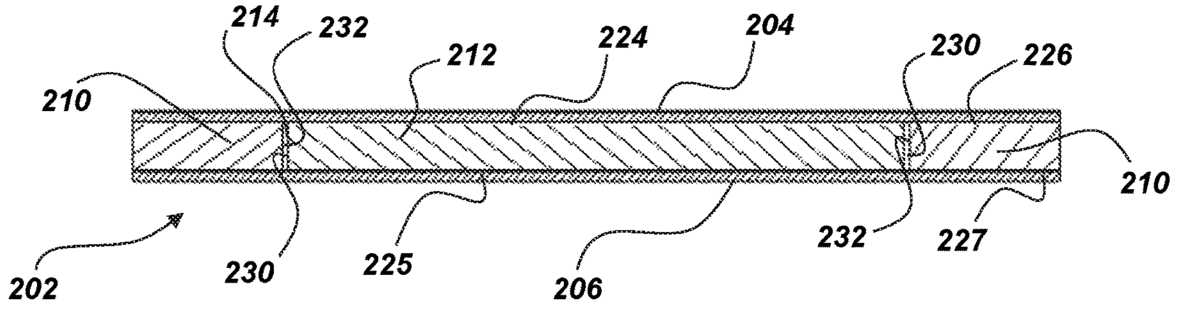
FIG. 14 is a cross-sectional view of a cushioning element according to an embodiment of the present disclosure.

FIG. 14 illustrates a cross-sectional view of a cushion 200. In some embodiments a top surface 224 of the cushion insert 212 and a top surface 226 of the perimeter cushion 210 may be substantially aligned after the cushion insert 212 is inserted within the void 214 defined by the perimeter cushion 210. The top layer 204 may abut against the top surface 224 of the cushion insert 212 and the top surface 226 of the perimeter cushion. In some embodiments, a bottom surface 225 of the cushion insert 212 and a bottom surface 227 of the perimeter cushion 210 may be substantially aligned after the cushion insert 212 is inserted within the void 214. The bottom surface 225 of the cushion insert 212 and the bottom surface 227 of the perimeter cushion 210 may both abut against the bottom layer 206.

In some embodiments the cushion insert 212 may be attached to the perimeter cushion 210 using adhesives, thermal boding, or mechanical fasteners. For example, a side surface 230 of the cushion insert 212 may be attached to a side surface 232 of the perimeter cushion 210 using glue (e.g. hot glue, water-based glue etc.), hook and loop adhesives, heat fusing, staples, stitching, fabric covers, etc. In some embodiments, the cushion insert 212 may be attached to the perimeter cushion 210 through the top layer 204 and/or the bottom layer 206. For example, the top layer 204 and/or the bottom layer 206 may be attached to both the cushion insert 212 and the perimeter cushion 210 using glue (e.g. hot glue, water-based glue etc.), hook and loop adhesives, heat fusing, staples, stitching, fabric covers, etc.

In some embodiments, a stabilizing material (e.g. scrim material) may be used to attach (e.g. adhere, glue, secure, etc.) the cushion insert 212 to at least one of the other elements, for example, the perimeter cushion 210, the top layer 104, and/or the bottom layer 106. The stabilizing material is described in U.S. patent application Ser. No. 15/662,934, "Mattresses Including Spacer Fabric and Related Methods," filed Jul. 28, 2017, assigned to the assignee of the present application, the entire disclosure of which is hereby incorporated herein by this reference. In some embodiments, the stabilizing material may only be placed over the cushion insert 212 and used to attach the cushion insert to the surrounding elements. In another embodiment, the stabilizing material may be placed over the assembled cushioning element 202 including both the cushion insert 212 and the perimeter cushion 210. The stabilizing material may then be used to attach the cushioning element 202 to the surrounding elements such as the top layer 204 and or the bottom layer 206.

In some embodiments, the cushion insert 212 may not be attached to the perimeter cushion 210. The cushion insert 212 may be removable and/or replaceable. In some embodiments, the cushion insert 212 may be attached through a releasable attachment method (e.g., hook and loop fasteners, VELCRO®, snaps, buttons, etc.). In other embodiments, the cushion insert 212 may rest on the bottom layer 206 with no attachment. The cushion insert 212 may be secured by surrounding the cushion insert 212 with the other elements of the cushion 200. The side surfaces 232 of the perimeter cushion 210 may secure the cushion insert 212 through contact with the side surfaces 230 of the cushion insert 212. The top layer 204 may secure the cushion insert 212 through contact with the top surface 224 of the cushion insert 212.

Figure 15:
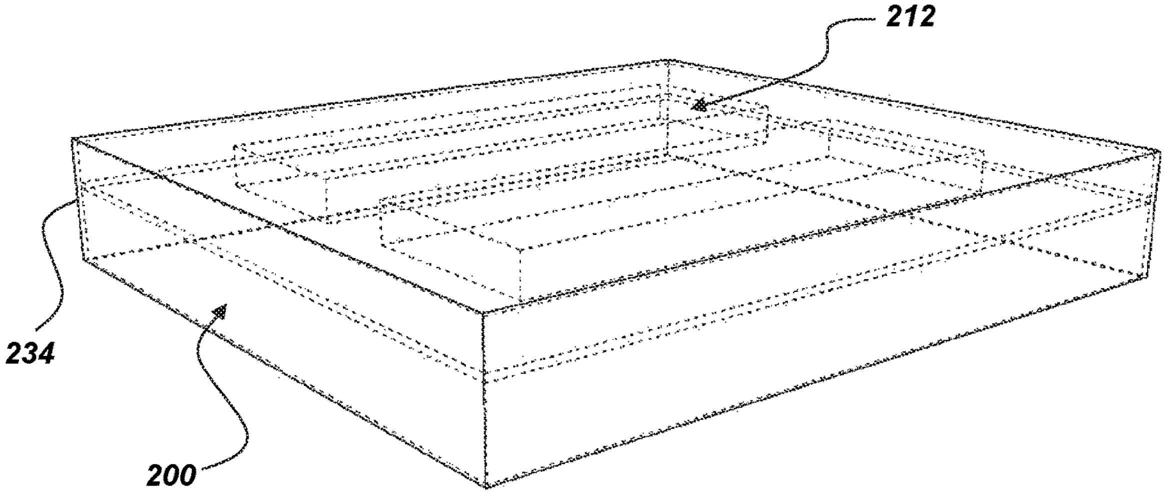
FIG. 15 is a perspective view of a cushion according to an embodiment of the present disclosure.

FIG. 15 illustrates an embodiment of the cushion 200. In some embodiments, a fabric cover 234 may encompass the cushion 200. Some examples of fabric covers are demonstrated in U.S. patent application Ser. No. 15/062,621, "Mattresses and Mattress Toppers Including Knitted Fabric, and Related Methods," filed Mar. 7, 2016; and U.S. patent application Ser. No. 15/063,143, "Cushion Cover with Integrally Knit, High-Relief Graphic Feature and Cushions Employing Such Cushion Covers," filed Mar. 7, 2016, both of which are assigned to the assignee of the present application, the entire disclosure of each is incorporated herein by this reference. In embodiments where the cushion insert 212 is not attached to the other elements of the cushion 200, the fabric cover 234 may secure the top surface 224 (FIG. 10) of the cushion insert 212. In some embodiments, where the cushioning element 202 is made up of multiple different materials in different zones and regions that may have different textures the fabric cover 234 may provide a uniform texture to the top of the cushioning element 202.

In some embodiments, the cushioning element 202 may be compressed. For example, the cushioning element 202 may be roll-packed into a cylindrical shape. Methods of roll-packing a mattress are described in, for example, U.S. Pat. No. 8,046,973, "Machine for Packaging Mattresses," issued Nov. 1, 2011; U.S. Patent Publication No. 2003/0074863, "Method for Roll Packing Foam Cores," published Apr. 24, 2003; U.S. Patnet Publication No. 2015/0203221, "System and Method for Packaging a Foam Product," published Jul. 23, 2015; and U.S. patent application Ser. No. 15/063,114, "A Bag for Shipping a Cushion and Related Methods," filed Mar. 7, 2016, assigned to the assignee of the present application; the entire disclosures of each of which are incorporated herein by this reference.

In some embodiments, the roll-packing machine may apply a load sufficient to transform the cushioning element 202 to a compressed form. As used herein, the term "compressed form" means and includes a state in which the cushioning element 202 has a size and shape different from its original size and shape, wherein the adjacent buckling walls 228 in the cushion insert 212 are substantially pressed together and may be collapsed such that hollow columns 230 may be minimized or may not substantially exist. As described in U.S. patent application Ser. No. 15/063,114, previously incorporated herein, the cushion 200 including the cushioning element 202 in compressed form may be packaged, such as in a cylindrical bag, and shipped to a customer. To use the cushion 200, the customer may remove the cushion 200 from the packaging and allow the cushion 200 and the cushioning element 202 to return to its original size and shape.

It has been observed that the elastomeric material, according to embodiments of the present disclosure, may be sufficiently sticky such that the cushion insert 212 may not return to the expanded form after the cushion 200 is removed from the bag. That is, the buckling walls 228 may stick to one another or remain stuck to one another after the cushion 200 is removed from the bag. In some embodiments, the cushion insert 212 may not return to the expanded form within a reasonable amount of time (e.g., less than about eight hours). In other embodiments, the elastomeric cushion insert 212 may not return to the expanded form without manually or mechanically manipulating (e.g. pulling on) the cushion insert 212 to separate the buckling walls 228. When the cushion insert 212 is inserted into the perimeter cushion 210 and covered by the top layer 204 and/or the bottom layer 206 of the cushion 200, the layers 204 and/or 206 may inhibit direct access to the elastomeric cushion insert 212 and may hinder manipulation of the elastomeric cushion insert 212 in order to separate the buckling walls 228. This sticking together of polymeric materials is referred to in the art as "blocking." To enable the elastomeric cushion insert 212 to return to the expanded form from the compressed form, a surface of the elastomeric cushion insert 212 may have a coating material (e.g. anti-tack material, anti-stick material) on surfaces of the buckling walls 228. Coating materials may include a thin film covering all portions of the buckling walls 228 as described in U.S. patent application Ser. No. 15/654,948, "Cushions Including a Coated Elastomeric Cushioning Element and Related Methods," filed Jul. 20, 2017, assigned to the assignee of the present application, the entire disclosure of which is hereby incorporated herein by this reference. Coating materials may also include powders as described in U.S. patent application Ser. No. 15/062,674, "Cushions Including a Coated Elastomeric Cushioning Element and Related Methods," filed Mar. 7, 2017, assigned to the assignee of the present application, the entire disclosure of which is hereby incorporated herein by this reference.

In some embodiments, the coating composition may be used as a lubricant for a wet saw. That is, after the cushioning element 211 (FIG. 10) is coated, and typically before the cushioning element 211 (FIG. 10) is dried, the cushioning element 211 (FIG. 10) may be cut. The coating composition may limit or prevent binding of the elastomeric material of the cushioning element 211 (FIG. 10) on a saw blade as the saw blade cuts the cushioning element 211 (FIG. 10). Production time and costs may be decreased because a separate lubricant need not be supplied. Furthermore, wash and dry cycles typically associated with conventional cutting lubricants may be avoided.

Forming cushions from multiple different materials in different zones and/or regions may significantly reduce the amount of wasted materials during the production process. Additionally, the amount of labor required for each cushion may also be reduced by making the process more efficient and improving the yield for each process. The increased efficiency with respect to materials and labor as well as the improved yield for each process may result in a significant cost savings for manufacturers of cushions.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventor.

What is claimed is:

1. A method of forming an assembled cushion, comprising:

forming a cushion comprising an elastomeric gel defining a top surface, a bottom surface, and a plurality of intersecting buckling walls defining a plurality of hollow columns extending between the top surface and the bottom surface;

positioning the cushion within a guide such that the top surface couples with a first bracing of a top portion of the guide and the bottom surface couples with a second bracing of a bottom portion of the guide;

compressing, via force applied to the cushion via the first bracing or the second bracing, the cushion to collapse the plurality of hollow columns such that adjacent buckling walls of the plurality of intersecting buckling walls are at least partly pressed together;

cutting the compressed cushion (i) between the top portion of the guide and the bottom portion of the guide and (ii) perpendicular to the top surface of the cushion to divide the cushion into at least one separate piece, the at least one separate piece having a same thickness as the cushion; and inserting the at least one separate piece into a receptacle of a cushioned frame to form the assembled cushion.

2. The method of claim 1, wherein forming the cushion comprises molding or casting the cushion from the elastomeric gel.

3. The method of claim 1, wherein forming the cushion comprises forming the cushion to have a length of about 80 inches to about 84 inches.

4. The method of claim 1, wherein forming the cushion comprises forming the cushion to have a width of about 76 inches to about 82 inches.

5. The method of claim 1, wherein cutting the elastomeric gel of the cushion comprises cutting the elastomeric gel to impart the at least one separate piece with a width of about 22 inches to about 27 inches.

6. The method of claim 1, wherein cutting the elastomeric gel of the cushion comprises cutting the elastomeric gel to impart the at least one separate piece with a length of about 54 inches to about 59 inches.

7. The method of any one of claims 1 through 6, wherein inserting the at least one separate piece into the receptacle of the cushioned frame to form the assembled cushion comprises inserting the at least one separate piece in a receptacle of a cushioned frame for a mattress.

8. The method of claim 7, wherein inserting the at least one separate piece into the receptacle of the cushioned frame to form the assembled cushion comprises inserting two separate pieces into corresponding receptacles of the cushioned frame to form the mattress.

9. The method of claim 7, wherein inserting the at least one separate piece into the receptacle of the cushioned frame to form the assembled cushion comprises inserting the at least one separate piece into a cushioned frame formed from the elastomeric gel.

10. The method of any one of claims 1 through 6, further comprising:

separating at least one piece of the at least one separate piece parallel to a top surface of the at least one separate piece to define a plurality of thin pieces.

11. The method of any one of claims 1 through 6, wherein inserting the at least one separate piece into the receptacle of the cushioned frame to form the assembled cushion comprises inserting each at least one separate piece in a corresponding receptacle in a cushioned frame to form at least one mattress cushion, each piece forming a support zone for supporting a body of a person resting on a mattress cushion.

12. The method of claim 11, wherein inserting each piece in the corresponding receptacle of the cushioned frame comprises inserting each piece in the receptacle of a cushioned frame formed from a foam.

13. The method of claim 11, further comprising:

affixing a scrim fabric integrally secured to a bottom surface of each piece to a bottom surface of the corresponding receptacle of the cushioned frame.

14. The method of any one of claims 1 through 6, wherein cutting the elastomeric gel of the cushion into the at least one separate piece comprises cutting the elastomeric gel of the cushion with a wet saw.

15. The method of any one of claims 1 through 6, wherein cutting the elastomeric gel of the cushion into the at least one separate piece comprises separating three smaller portions oriented side-by-side in a longitudinal direction relative to a length of the cushion to form three pieces and separating a fourth portion of the cushion oriented horizontally relative to the length of the cushion to form one piece.

* * * * *